INVENTOR.
JOSEPH C. WAGNER

Sept. 20, 1966      J. C. WAGNER      3,273,914

MACHINE FOR PRODUCING AND ISSUING BUSINESS FORMS

Filed Oct. 15, 1964      5 Sheets-Sheet 5

*INVENTOR.*
JOSEPH C. WAGNER
BY

ATTORNEYS

3,273,914
MACHINE FOR PRODUCING AND ISSUING BUSINESS FORMS

Joseph C. Wagner, Timonium, Md., assignor to Universal Controls, Inc., Towson, Md., a corporation of Maryland
Filed Oct. 15, 1964, Ser. No. 403,979
5 Claims. (Cl. 282—16)

This invention relates to a machine for producing and issuing business forms, and has particular reference to machines for use in the sale of documents having contractual value.

In various instances, it is desirable to issue or produce contractual documents to or for purchasers either with or without cooperation of personnel representing the vendor. One example is the issuance of insurance policies, usually for travel insurance. Machines have been provided for this purpose which may be located at airports, railroad stations, or the like, arranged to receive one or more coins and operated upon their insertion to open a write-in area within which there is exposed a form on which the purchaser may write his name, address, beneficiary, and other pertinent matter. Below this form there is another form, corresponding thereto, on which matters written on the top form may be reproduced through the use of carbon backing or other reproducing means. After the customer finishes writing in the required information, he may then operate a button or lever which effects printing of an amount on both forms, closes the write-in area, and advances strips containing the forms so that the lowermost is moved to a locked reception region within the machine casing while the upper portion is advanced, cut off, or presented for tearing, and delivered to the customer.

One drawback of such machine is that to secure more than some minimum value of the contract, it is necessary that multiple coins be introduced which may not be readily available at the point of sale. For example, in the case of insurance vending machines, the basic value is usually a quarter dollar. If the customer desires insurance of considerably more than basic value he must insert a corresponding number of quarters. The machine must have sufficiently elaborate internal mechanism to count the coins inserted and print on the forms an amount corresponding thereto. Machines capable of issuing such documents upon the insertion of paper currency are necessarily quite expensive because of the elaborate detecting systems required for the recognition of genuine currency.

As applied to the matter of insurance, the present machine may receive tokens which may have a value, for use in the transaction, of any arbitrary amount. Such tokens may be purchased, for example, at a newsstand, a ticket window, or the like, and the seller need only receive in currency, or by way of a credit card, payment, giving a customer a token which the customer may then use to operate the machine. The seller is not held up during the time the customer writes in the required data, and need do nothing after the token is sold. For example, in the case of an insurance machine, the basic amount to be paid may be one or two dollars, or the like. For maximum simplicity, the machine may be provided to issue only a single value policy. If the customer desires more, he may write out and issue, one after the other, a number of policies. This, it may be noted, is not a drawback since it is usual, when insurance over a certain amount is desired, that a purchaser must execute and sign more than one policy. If sales are for small amounts, coins may be inserted instead of tokens.

Another use of the machine to which it is particularly adaptable is for the issuance of sweepstake tickets. In such a case, typically, two strips are advanced, just as described for insurance vending, one above the other and arranged so that matter written on the top strip will be produced on the bottom one. In this case each unit area will represent a fixed value ticket. The reason for this is, of course, because the tickets will ultimately be put into a drum and drawn to determine potential winners in accordance with established rules. Because of restrictive laws, official tickets are retained in the machine in the form of an unsevered strip received in a receptacle locked against unauthorized access. From time to time, the marked and validated portions of this strip may be removed under suitable precautionary conditions and deposited in a bank, to be ultimately cut into individual tickets which may be assembled in a drum for drawing. Suitable regulations may be established making the tickets within the machine the sole documents of value as evidence. Payments to winners may be made only by checks directed to the names and addresses appearing on such tickets. While areas of the top strip will be issued, they may be made by established regulations to have no real value, their value being purely psychological or at most memoranda of purchase. They merely satisfy the purchaser that something has occurred representing the fact that he has purchased a ticket located within the machine. These receipts cannot be sold to give another party evidence, presentable to the authorities, of his purchase of a ticket. The value of the machine is both to prevent fraud and to facilitate the ticket-selling transactions.

Typically, a ticket may be sold for three dollars. Assuming the sweepstakes to be operated by a state, the tickets may be sold at racetracks, at state liquor stores, or at banks or other specified locations. Because many bettors may desire to buy a plurality of tickets, the complete transaction for a particular person may be substantially drawn out in time in view of the fact that names and addresses must be inserted on all individual tickets. It would be very undesirable to tie up a clerk who would merely stand by doing nothing during the writing in of ticket data if his activities were confined to a single machine. If he were attending a number of machines, he would have to control them individually after each ticket was written to provide for issuance of the next. The ticket issuing transactions, therefore, may be much speeded up if an attendant, in charge of a number of machines, could merely sell tokens for placement in the machine to make possible operation by a customer. However, a further consideration is involved in that tokens having a value, for example, of three dollars, are sufficiently valuable to tempt counterfeiters. It is desirable, therefore, to keep control of the tokens entirely in the hands of the attendants, who alone may insert them in the machines. Desirably, however, the attendant should not be required to return to each machine after issuance of a ticket therein. If, for example, a particular customer desired to buy five tickets, it would be advantageous if the attendant could put them in a chute (the chute and tokens being inaccessible to the customer) so that after the customer wrote out and issued one ticket he could manipulate the machine to make it available for the issuance of a second ticket, and so on, until all of the tokens exercise their control functions. In other words, the chute would merely in effect substitute for the attendant's holding five tokens in his hand and dropping them into the machine individually when called upon to do so by the purchaser.

In view of the fact that the attendant would be responsible for accounting in money for the tickets issued, as recorded in the machine, the tokens themselves would have substantially no intrinsic value. In fact, the attendant may be permitted to remove the used tokens from the machine and place them in a supply receptacle from which he can retake them for control of operation.

It will be seen from the foregoing that in dealing with each customer the attendant is required to do little more than receive the money, the additional activity being merely that of putting the desired number of tokens in a machine which is available and to which the customer may be directed.

The broad object of the present invention is to provide a simple and reliable machine for operation in accordance with the foregoing discussions. Its simplicity and reliability render it capable of being used and simply manipulated by customers with minimum directions to them as to the operations to be carried out.

Further objects of the invention relate to such matters as insuring that valid tickets or forms are issued, this term being used in the sense of issuing the validated tickets or documents into the machine itself. It may be provided as a contractual understanding that only what is retained in the machine constitutes a document representing any valid claim. What is actually delivered to the customer may be regarded as nothing more than a memorandum, of no value at all in the case of issuance of sweepstake tickets, or merely providing some prima facie evidence in the case of insurance policies requiring an insurance company to make available as evidence a document corresponding to that issued.

Further objects of the invention relating to advantageous details of construction and operation will become apparent from the following description, read in conjunction with the accompanying drawings, in which.

Figure 1:
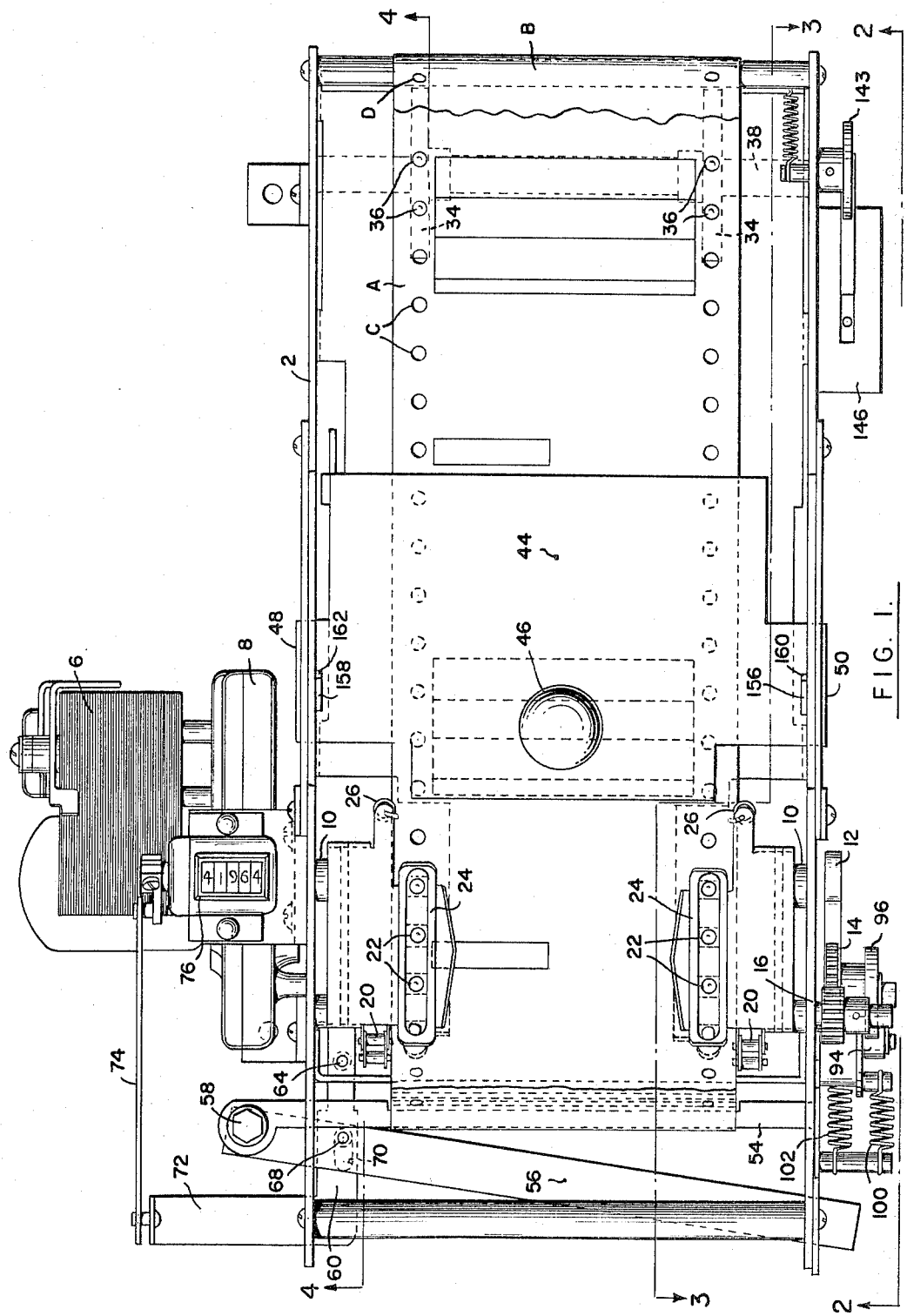
FIGURE 1 is a plan view of the operating unit of a machine, this unit being enclosed within a suitable housing.

The major operating parts of the machine are mounted in a frame 2, the construction of which will be evident from the drawings. The operating unit particularly shown in FIGURES 1 to 4, inclusive, is mounted within a housing which is indicated generally at 4 and has the usual aspects common to ticket and similar issuing machines of being locked against unauthorized access, and provided with suitable openings for operating parts, visual inspection, exit of receipts, etc. This housing contains also conventional receptacles for supply strips and for the validated strip which is received therein. The housing is subject to such variations in construction made for convenience for different uses that it is unnecessary to describe it in detail.

A motor 6, desirably of the type which is subject to automatic braking when its exciting current is interrupted, drives through reduction gearing 8 a shaft 10 on which is mounted a gear segment 12 (FIGURE 2) which during operation involving a single revolution of the shaft 10 engages and drives a pinion 14 which in turn meshes with and drives a pinion 16 secured to a shaft 18. Shaft 18 carries driving sprocket which, together with sprockets on a parallel shaft 19, support chains 20 the links of which are provided with pins 22 engageable in openings C and D of lower and upper paper strips A and B, respectively. The movements of these chains and their corresponding pins advance the sheets simultaneously in fixed relationship with each other across the top of the mechanism. Hinged pressure elements 24 are held down by springs 26 and are provided with grooves for the clearance of pins 22, serving to hold the sheets on the pins.

A guideway 28 for strip A is provided between plates 30 and 32 leading this strip over a roller 34 provided with the pins 36 for engagement by the holes along the edge of the strip. Advance of the strip drives the roller 34 which is secured to a shaft 38. As will hereafter appear, failure of this strip to feed properly will render the machine inoperative and therefore avoid the possibility of improper operation. The strip B passes outside the plate 32, and this strip is guided over a rod 40 joining the strip A in passage over a backing plate 42. A horizontally slidable door 44 is guided for movement in the frame by lateral projections 48 and 50 which ride in suitable slots. This door is provided with a knob 46 by which it may be manually moved when unlocked. The door underlies and closes an opening in the top plate of the machine housing, and normally prevents access to the strips A and B. When it is opened it provides a write-in area so that a customer may write upon the exposed surface of the strip B, the written matter being reproduced on the strip A either by reason of the provision of a carbon backing on the strip B, the provision of conventional sensitized paper which produces visible markings upon the application of pressure, by the provision of a carbon ribbon, or the like. During the writing the plate 42 provides a rigid backing.

From the plate 42 the paper strips pass together over the feeding chains, the pins 22 engaging their holes C and D, and they are then separated by the plate 52, this plate forming with a second plate 53 a guide way through which the lower strip A is fed to a receptacle (not shown) within the machine housing which is locked against unauthorized access. This strip contains the forms which are validated and contain the written data and which will generally legally constitute the original documents evidencing the transactions.

The upper strip B passes between a fixed knife blade 54 and a movable blade 56 which is normally open and which is pivoted at 58 to the machine frame. A link 60 is pivoted to the upper end of a lever 62 and is provided with a pin 64 acted upon by a tension spring 66 which is anchored to a pin 68 secured to the movable knife blade 56. A slot 70 in the link embraces the pin 68. An extension 72 of the link is connected to another link 74 which serves to advance a counter 76 upon each severance of the strip B. A receipt B' severed from this strip falls downwardly into a receptacle open to the customer and from which it may be removed. The lever 62 is pivoted to the frame at 78 and is provided with a follower roller 80 engageable by a lobe 82 of a cam 84 secured to the shaft 10. The cam 84 is also provided with a pin 86 engageable with an arm 88 of the lever 62. By the actions of the lobe 82 and pin 86 positive cutting and return movements are aparted to the movable knife 56 with incidental advance of the counter 76.

Figure 2:
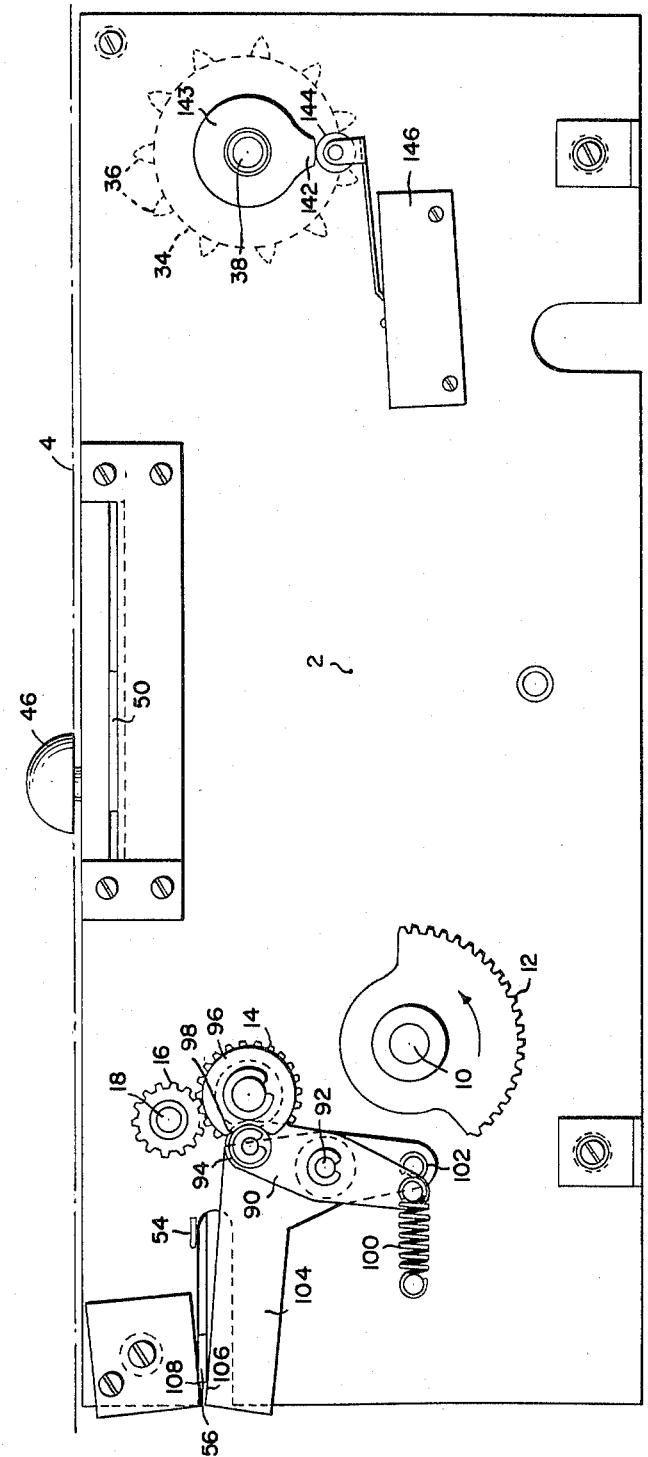
FIGURE 2 is a side elevation viewed from the plane indicated at 2—2 in FIGURE 1 in the direction of the arrow.

Referring to FIGURE 2, a lever 90 pivoted at 92 is provided with a detent roller 94 engageable in a depression 98 in a disc 96 secured to the pinion 14. A spring 100 acts on the lever 90 to cause it to act as a yieldable detent latching the gear 14 in a predetermined position to determine a proper location of areas on the paper strips.

Also mounted on the same pivot pin 92 is a lever 104 urged clockwise as viewed in FIGURE 2 by a spring 102. An end 106 of this lever presses upwardly against the free end of the movable knife 56, providing a pinching action thereon in cooperation with a fixed surface 108. Clockwise rocking of the lever 62 by the cam lobe (FIGURE 4) will pull link 60 toward the right tensioning the spring 66. When this tension becomes sufficiently great by reason of the movement of lever 62, or when the forward end of slot 70 engages the pin 68 to give an initial positive knife movement, the movable blade is snapped from between the elements 106 and 108 to provide a quick cutting movement effective to provide clean severance of the strip. In other words, a quick cutting action is secured even though the action of cam lobe 82 produces a relatively slow rocking of the lever 62.

Figure 3:
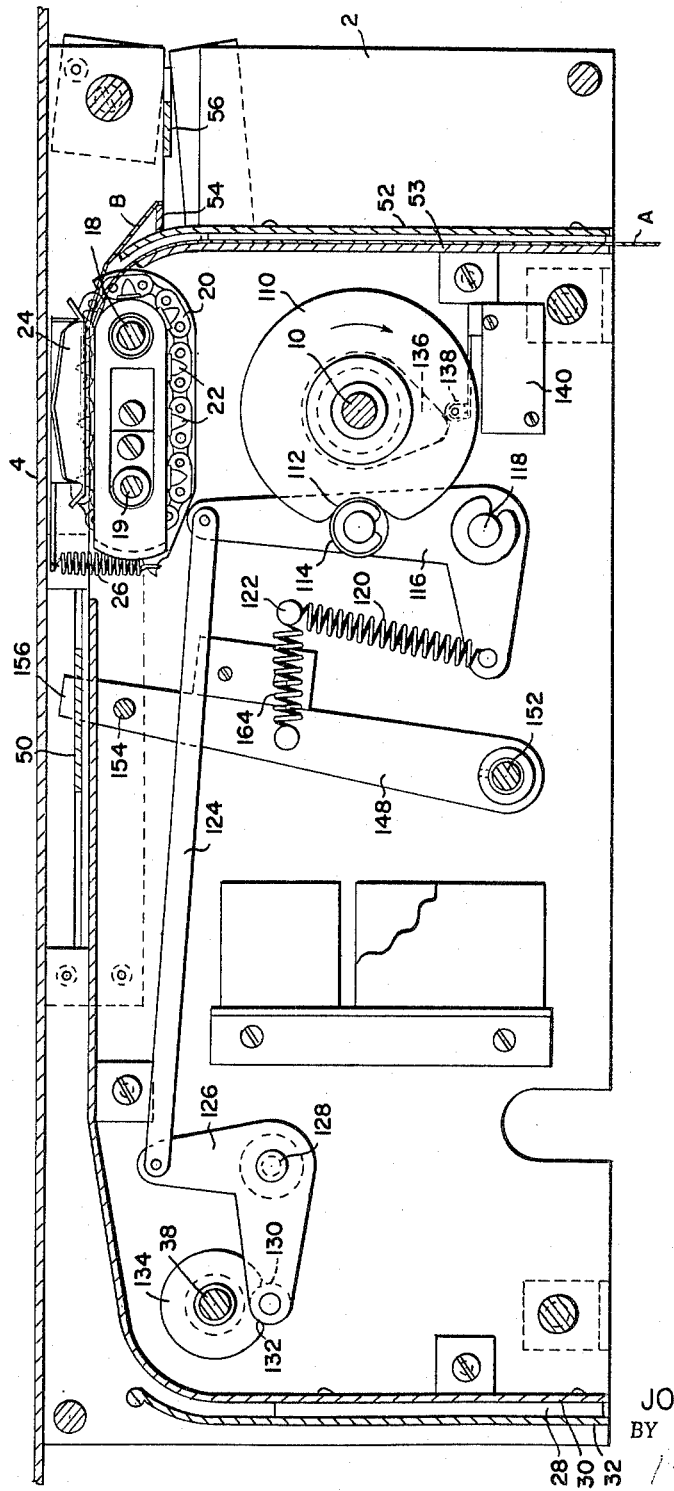
FIGURE 3 is a vertical section taken on the broken surface indicated at 3—3 in FIGURE 1.

Referring next to FIGURE 3, the shaft 10 has secured thereto a cam 110 provided with a depression 112 acting on a roller 114 carried by a lever 116 pivoted to the frame 118 and urged clockwise by a spring 120 secured to a fixed pin 122. The upper end of the lever 116 is connected by link 124 to a bell crank 126 pivoted at 128 and carrying a detent roller 130 adapted to enter a notch 132 formed in a disc 134 secured to the shaft 38 carrying the drum 34 provided with the pins 36 as previously described. When the shaft 10 is in its rest position illustrated, the detent roller 130 prevents rotation of this drum and advance of the strip A.

A cam 136 secured to the shaft 10 is arranged to engage the follower 138 of a microswitch 140 to actuate this switch momentarily just before completion of a cycle of operation as will be referred to hereafter in a description of the circuitry and the operations involved. In the rest position of the parts the cam 136 has passed the follower 138.

Referring to FIGURE 2, a lobe 142 of a cam 143 secured to the shaft 38 engages the operating roller 144 of a switch 146 to hold this switch closed when the machine is in rest position. This switch insures proper alignment of the strip A engaging the pins 36 of drum 34.

A pair of levers 148 and 150 are secured to a transverse shaft 152 provided in the frame and are further secured together by a cross rod 154 to provide a rigid structure. Their upper ends 156 and 158 respectively extend through slots 160 and 162 in the lateral extensions of the sliding door 44 to control its movements. A strong spring 164, secured to the lever 148 and anchored at the pin 122 urges the sliding door towards closed position.

A vertically extending lever 166, pivoted to the frame at 170, has its upper end 168 in engagement with the rear edge of the door 44 when the mechanism is in rest position. A spring 172 pulls this lever 166 counterclockwise as viewed in FIGURE 4, the spring 172 reacting between the pin 173 carried by the lever and a pin fixed in the frame.

Figure 4:
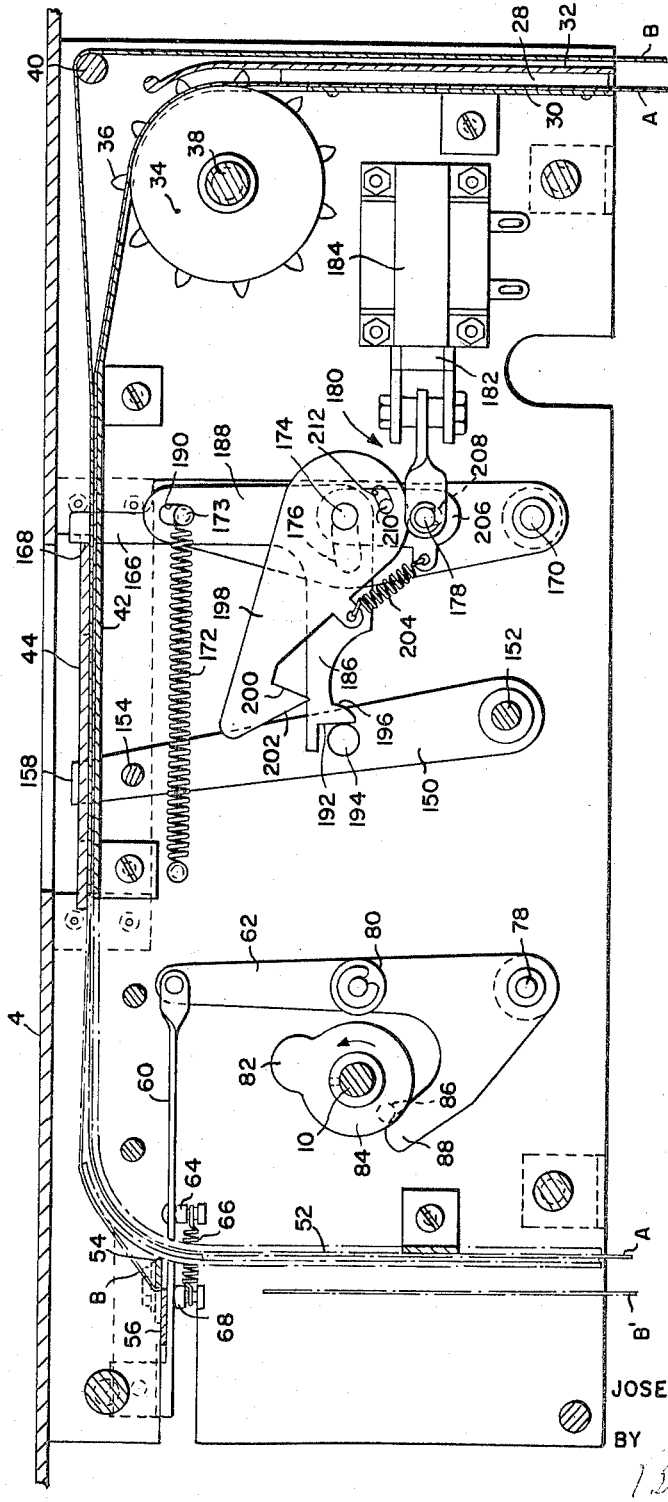
FIGURE 4 is a vertical section taken on the broken surface indicated at 4—4 in FIGURE 1.

A fixed pin 174 projects through an arcuate slot 176 in the lever 166 to permit a limited clockwise movement thereof as viewed in FIGURE 4. The lever 166 carries a pin 178 connected by a linkage 180 to the plunger 182 of a solenoid 184 which, when energized, pulls the lever 166 clockwise.

A detent 186 is pivoted on the fixed pin 174 in front of the lever 166 and has an upward extension 188 provided with a slot 190 embracing the pin 173. The reason for this pin and slot connection is to permit clockwise movement of the detent 186 with the lever 166, taking into account the different pivotal mountings 174 and 170. The detent 186 is provided with a nose 192 engageable with a pin 194 carried by the lever 150, and normally prevents rearward movement of the sliding door 44. The nose has a cam portion 196 to cause the detent to be lifted by the pin 194 during operation as will be described hereafter.

Pivotally mounted on the fixed pin 174 is another detent 198 provided with a hook surface 200 and a cam edge 202. A tension spring 204 reacts between an ear of the detent 198 and an ear of another member 206 which lies between the detent 198 and the detent 186, and is also pivoted on the fixed pin 174. This element 206 is provided with a slot 208 which embraces the pin 178 to provide for rocking of the element 206 with the lever 166 despite their relatively displaced centers of pivotal movement. The spring 204 urges the detent 198 counterclockwise to a limited position determined by engagement of a pin 210 carried by the element 206 with one end of a slot 212 in the detent 198. The assembly provides for latching and release of the slidable door 44 as will be decsribed in a review of operation.

Figure 5:
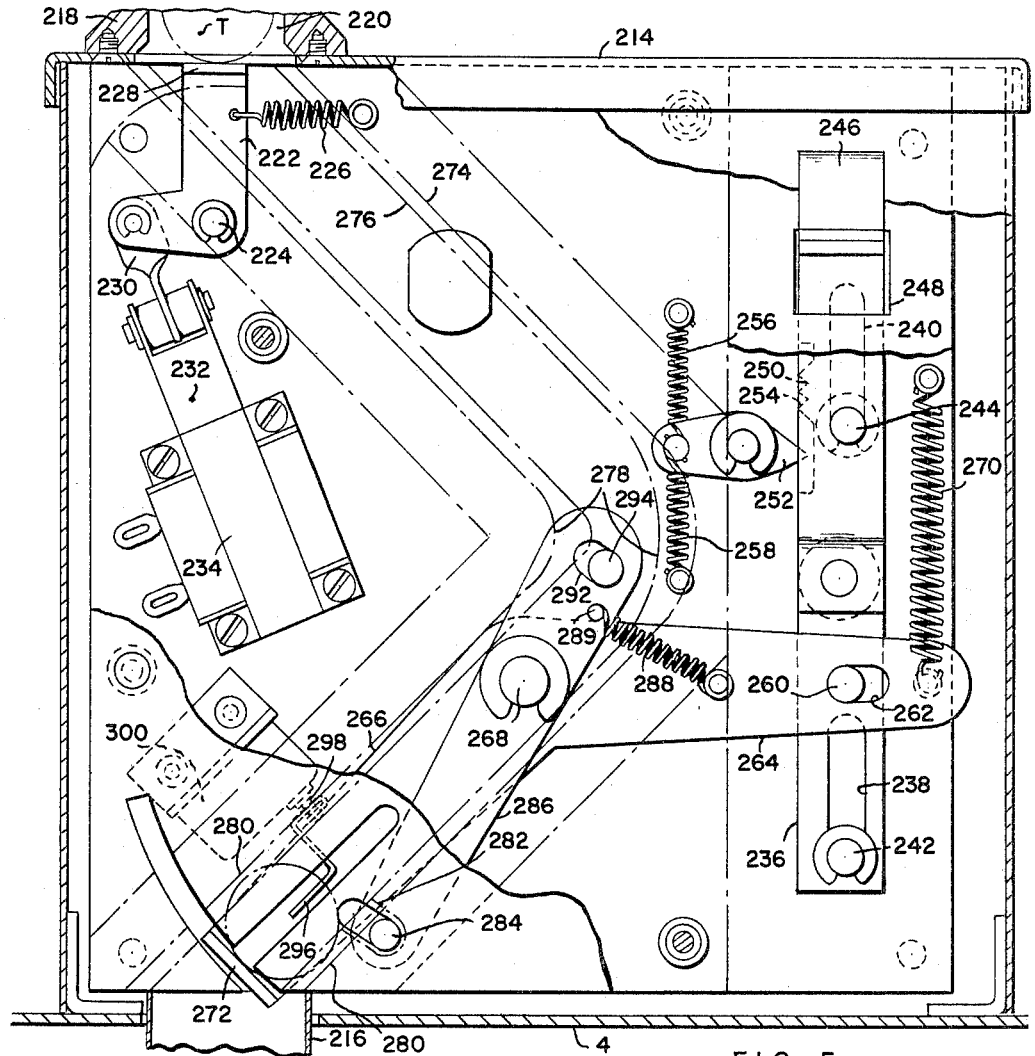
FIGURE 5 is an elevation partly broken away and in section showing controlling means operable by a token or coin.

While the machine may be operated in other fashions, it is herein consistently disclosed as arranged for operation by the insertion of tokens, and reference will now be made to FIGURE 5 which shows an assembly of the machine particularly concerned with token control. This assembly may be provided in an auxiliary subhousing 214 secured to the main housing and locked against tampering. At the lower end of this there is an outlet 216 in the form of a guide to direct tokens into a receptacle in the main housing which may take any desired form and is not specifically shown herein. At the top of the token-handling assembly there is a chute 218 only the lower portion of which is shown but which may be either of such length as to receive a single token T or a number of these. The token-receiving passageway is indicated at 220. A lever 222 pivoted at 224 and urged clockwise to the position shown by a spring 226 presents a turned ledge 228 preventing the passage of tokens from the chute 218 unless removed from their path. The lever 222 has an arm connected through a link 230 to a plunger 232 of a solenoid 234 which may be energized to permit token entrance into the unit.

A vertical slide 236 has slots 238 and 240 respectively embracing pins 242 and 244 to mount it for vertical sliding movement. An accessible knob 246 projects outwardly of the unit through an opening 248 to permit manual movement of the slide by a customer. To insure full-stroke operation, the slide is provided with an arrangement 250 providing upper and lower clearance spaces and a series of teeth 254 cooperating with the pointed nose of a detent 252 which normally occupies an approximately horizontal position as shown in FIGURE 5 under the action of a pair of tension springs 256 and 258 operating reversely thereon. If the slide is moved downwardly from the rest position illustrated, the detent nose will be depressed by the successive teeth 254, but the notches between these teeth will not permit the detent nose to rise to a horizontal position. Accordingly, unless it is depressed so that all of the teeth clear the detent it will be latched against rise. But if such clearance is effected, the slide may rise to bring the detent clear of the lower end of the series of teeth. The arrangement also requires a full rise of the slide before it may be again depressed.

The slide 236 carries a pin 260 entering a slot 262 in a lever 264 which is pivoted at 268 to the frame and is provided with a depending arm 266. A spring 270 urges the lever 264 counterclockwise and because of the pin and slot connection urges the slide 236 to its uppermost position.

The lever arm 266 has a lower turned end 272 which, when the lever is in its rest position, closes the lower end of a guideway 274 providing a passage for tokens T which are retained therein by side flanges 276. This guideway has a bent form as indicated in FIGURE 5 which prevents possible tampering with the mechanism. The bend in this passageway is indicated at 278 and its lower portion at 280.

Near its lower end and above the position of rest of a token on the turned end 272 there is a side slot 282 in the guideway which receives a pin 284 secured in the lower end of a lever 286 pivoted on the mounting 268. A light spring 288 affixed to pin 289 fixed in lever 286 interconnects the upper end of this lever and the horizontally extending arm of the lever 264. The pin 289 extends laterally to overlie the horizontal arm of lever 264. With the parts in rest position, the lever 286 occupies the position shown in FIGURE 5, with the pin 284 withdrawn from a position in which it might arrest a token. When the lever 264 is rocked clockwise, however, and withdraws from pin 289 the force on the spring 288 imposed by that movement will rock the lever 286 slightly clockwise to a position limited by engagement of the left-hand end of slot 292 with a fixed pin 294. Under these conditions the pin 284 is projected inwardly of the guideway in position to arrest a token.

A token located in the lower end of the passageway engages an arm 296 carried by an operating shaft 298 of a switch 300, which, in the absence of a token occupies one position but is moved to an alternative position when a token is present.

Figure 6:
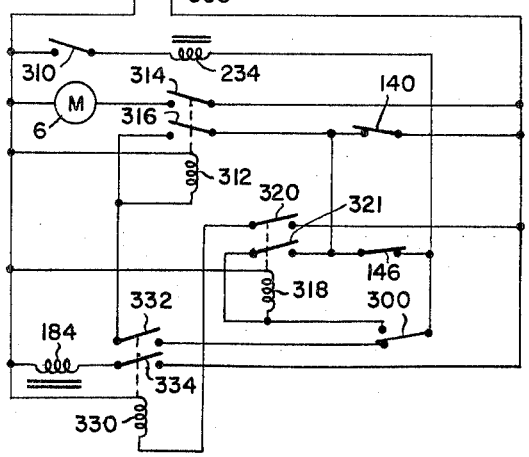
FIGURE 6 is a schematic diagram of electrical elements involved.

Reference may now be made to FIGURE 6 which shows schematically the electrical connections of various elements already described and also of others which have not been shown physically since their placements are quite arbitrary. Power line terminals are shown at 308. A pushbutton switch 310 is connected in series with the solenoid 234. This switch may be located in any desired position, and if the machine is controlled by an attendant it may be accessible only to him but inaccessible to a customer. If the machine is to be customer actuated it may be accessible to the customer.

A relay 312 has a pair of normally open contacts 314 and 316. Closure of the former upon energization of the relay completes the circuit of the driving motor 6. The contact 316 is a holding contact for the relay 312. A second relay 318 has a pair of normally open contacts 320 and 321. The latter of these is a holding contact. The former, 320, serves to energize another relay 330 which has a pair of normally opened contacts 332 and 334. The latter, when closed, serves to energize the door release solenoid 184. The former serves to energize the relay 312.

In the case of the various switches, 310 is normally open, 140 and 146 are normally closed, and the movable element of switch 300 normally engages the lower contact illustrated. The various connections between these elements will be clear from the diagram in FIGURE 6 and from the operational matters about to be described.

The operation is as follows:

The parts are shown in their rest positions, assumed when the machine is idle, consistently in all of the figures of the drawings. The sliding door 44 is closed, covering the portion of the strip B which is in position for writing in the appropriate data. The closed position of the door prevents tampering with, and marking of, the strips.

No token is present in the passageway so that the switch 300 is in its lower position. Solenoid 184 is deenergized.

Slide 236 is in its upper position. The turned end 272 of lever 266 blocks the bottom of the token passageway.

The switch 140 is closed, the cam 136 carried by shaft 10 having previously passed out of engagement with the follower roller 138 of the switch.

Switch 310 is open so that solenoid 234 is deenergized. The motor 6 is deenergized. The three relays are also deenergized.

From the foregoing, and from the connections as illustrated in FIGURE 6, it will be seen that the entire electrical system is deenergized.

As to the mechanical parts, when the gear segment 12 leaves its driving relationship with pinion 14, the previous strip feed has been completed to put in proper orientation with the write-in opening portions of both strips on which writing should occur as would usually be indicated by a preprinted informative area on the upper strip B. If this condition actually exists, and the strip A, which is not visible when the door is open, is unbroken, the shaft 38 is in a position locating the cam lobe 142 in engagement with roller 144 to hold the switch 146 in closed position. Shaft 38 is at this time latched by engagement of roller 130 in the notch 132 in disc 134, this engagement occurring because the roller 114 is in the notch 112 in disc 110 on shaft 10.

The movable knife 56 is held open by engagement of the end of slot 90 with pin 68, the link 60 provided with this slot being positioned by engagement of pin 86 on shaft 10 with the arm 88 of lever 62. The knife is then pinched between the edge 106 of lever 104 and the associated member 108.

The door 44 is latched against manual movement by the nose 192 of detent 186 which is pivoted on the fixed pin 174 which takes any thrust imparted to the door.

All of the parts being thus ready for an operation, either the customer or an attendant may place one or more tokens in the chute 220, depending on its length: i.e., it may be of a length to receive only a single token at a time, but it may be sufficiently elongated to receive any desired number of tokens.

Assuming that a number of tokens are in the chute 220 (the operation about to be described being similar if only one is present), the attendant or customer will close the switch 310, which action will energize the solenoid 234 to remove from below the lowermost token the upper end 228 of lever 222, permitting the tokens to enter the passageway 276 with the lowermost eventually coming to rest against the turned end 272 of lever 266. The path of energization of the solenoid 234 may be traced from the left-hand line through switch 310, the solenoid, and closed switches 146 and 140 to the right-hand line. The presence of a token resting on the turned end 272 shifts switch 300 to its upper position, with the result that relay 318 is energized through a path which may be traced from the left-hand line through the relay and through the switches 300, 146 and 140.

Contacts 320 and 321 of relay 318 are closed, and the latter provides a holding circuit running from the left-hand line through the relay 318 and through switch 140 to the right-hand line. Closure of contact 320 connects relay 330 between the lines, so that the contacts 332 and 334 are closed. Closure of contact 334 energizes the door release solenoid 184. The closure of contact 332 effects no operation since the switch 300 is now in its upper position.

The solenoid pulls the lever 166 toward the right as viewed in FIGURE 4 against the action of spring 172. The result of this is to rock the detent 186 clockwise to release its nose 196 from the pin 194. At the same time, the rocking of lever 206 moves the pin 210 so that the second detent 198 may drop in position to the right of the pin 194. This last movement is produced through the spring 204.

The sliding door 44 is now free to be moved rearwardly by the customer through manipulation of the knob 46. This manual movement is resisted by the relatively strong spring 164. As the door is moved, the pin 194 engages the sloping end 202 of the detent 198, camming the detent upwardly against the action of spring 204, the movement being permitted by a clearance afforded by the slot 212 with respect to the pin 210 which is now in the position which permitted the lowering of the detent. After the pin 194 clears the detent edge 200, the detent moves downwardly to prevent return of the pin 194 and the sliding door after the knob 46 is released.

The door, latched in open position, exposes the write-in area so that the customer may write in the desired data. It will be understood, of course, that associated with the machine is an appropriate display of instructions to be carried out sequentially by the customer, including the manipulations to be effected and the data to be entered appropriate to the particular use of the machine which is involved. The parts remain in the positions described until a further manipulation is effected, so that the customer has all of the time he may desire to write in the required information.

The transaction is completed by depression of the slide 236 by the customer. This rocks the lever 264 which produces in sequence a number of operations.

Rocking of lever 264 produces rocking of lever 286 through spring 288 to arrest a token, if any, above that in lowermost position, and then releases the lowermost token by movement of the turned end 272 to clear the lower end of the chute. As the lowermost token drops, switch 300 returns to its lower position.

Since relay 330 is now energized, a circuit is completed through relay 312 which may be traced from the left-hand line through the relay winding, the now closed contact 332, switch 300 and switches 146 and 140 to the right-hand line. The energization of relay 312 closes its contacts 314 and 316.

The closure of contact 316 holds the relay energized through the closed switch 140.

The closure of contact 314 energizes the motor which starts its drive cycle.

When the slide 236 is released, the lever end 272 moves to block the chute and then lever 286 is rocked by the action of lever 264 on pin 289 and the next token, if any, is released by pin 284 to drop on end 272.

Switch 300 would then be again moved to its upper position; but relay 312 is now self-locked, so that the opening of its original energizing circuit has no effect. It will be thus seen that whether or not a second token is present has no operative significance at this time.

All three relays remain energized, and the solenoid 184 also remains energized.

The mechanical cycle now takes place as follows:

As soon as the shaft 10 starts rotating, the cam 110 rocks the lever 116 to effect release of roller 130 from the notch 132 of the disc 134, thereby releasing the shaft 38 and the pin drum 34 secured thereto. From this point on in the operation it may be noted that either of the discs 110 or 134 holds its respective roller 114 or 130 out of notch engaging position. An interlock is thus provided, neither of the rollers 114 nor 130 being able to drop into its notch unless both may do so.

Following the operation just mentioned, the gear segment 12 meshes with the pinion 14 and drives through it the feeding chains which carry the feed pins 22. The strips A and B are thus fed. When the feeding action terminates by disengagement of the segment 12 from pinion 14, roller 94 which has been cammed outwardly by the driving action drops into the notch 98 in disc 96 secured to the pinion 14, serving to prevent overrun of the feeding chains and insure new and proper alignment of the strips A and B with the write-in opening and the proper alignment of strip B for cutting. A full ticket length of this last strip will have been projected beyond the cutting line of the knives.

The cam 82 now engages the roller 80 to rock the lever 62 pulling link 60 rearwardly. The slot 70 in this link provides play so that pin 68 which is carried by the movable knife 56 is not immediately engaged; but the spring 66 is tensioned. The movable knife 56 will ordinarily be retained against this tension by the pinching action of lever 104 under the effort of the strong spring 102. But when the end of the slot 70 engages the pin 68, the knife is forcibly released and is then snapped closed by the tensioned spring 66 to produce a quick and clean cutting action. The receipt B' is thus severed and delivered to a trough from which it may be removed by the customer.

As the shaft 10 approaches the end of its rotation, pin 86 rocks lever 62 to reopen the knife and put it in its pinched condition.

The operation of the knife advances the counter 76.

Just prior to the end of the cycle the cam 136 engages the roller 138 to open the switch 140.

The opening of the switch 140 deenergizes the relay 312, since it will be noted that this relay circuit depended for completion on the closure of this switch. (Relays 318 and 330 will have been previously deenergized as pointed out below.) The motor 6 is accordingly deenergized and the solenoid 184 is also deenergized.

If the feed has been proper, shaft 38 will have been rotated by the strip A to a position aligning the notch 132 with the roller 130, and at the time when the cam 136 engages the roller 138 the roller 114 will be positioned on the entrance slope of the notch 112. Since the roller 130 is free to drop into the notch 132, the action of the spring 120 will cause the roller 114 to cam the shaft 10 slightly further to bring it into its rest position (backlash in the driving gearing permitting this even though the motor has stopped), and to advance the cam 136 slightly to clear the roller 138 so that the switch 140 will be again closed. Ordinarily, therefore, the movement of the switch 140 is only momentary, but this suffices to deenergize the relays.

If the strip A was properly fed, the shaft 38 through the action of cam 142 will have reclosed the switch 146 which will have been open at the beginning of the feed of the strip A. As will be evident from the description of the initiation of operation, a closed position of the switch 146 is essential for operation, so that, if feed has been improper, for example by reason of tearing of strip A or its exhaustion, the switch 146 will not be reclosed and the machine will become inoperative, calling attention to the maloperation. This is important since the strip A is invisible from the write-in area and in interactions of the type here involved it is essential that the strip A should always be properly fed and positioned so as to have thereon the proper indicia to constitute a valid contract. The roller 34 is sufficiently to the rear of the write-in area exposed by the door 44 that whenever a complete operation is permitted a write-in area of strip A will have been in position for data entry.

It may also be noted that the interconnection previously described in involving the discs 134 and 110 also serves to prevent maloperation, since if the notch 132 is not aligned with the roller 130 at the end of a cycle, the roller 114 will not enter the notch 112 to cam the shaft 10 to produce reclosing of the switch 140.

In the foregoing description the control of the door was passed over. The short lobe of cam 142 disengages the roller 144 practically as soon as the strip feed starts, opening the switch 146. The opening of this switch effects opening of the holding circuit of the relay 318 which becomes deenergized, and the opening of contact 320 deenergizes the relay 330 opening the contact 334 and thus deenergizing the solenoid 184.

Deenergization of solenoid 184 permits the lever 166 to be rocked by the light spring 172 sufficiently to raise the end of detent 198 to release the pin 194 so that the sliding door 44 will be closed by the action of the strong spring 164. (It may be noted that this movement of lever 166 is permitted by the fact that it is pulled clear of the end of the locked door by the energization of the solenoid 184, and its movement into engagement with the door is sufficient to raise the detent 198 to release pin 194.)

In the door closing movement, the pin 194 engages the cam surface 196 behind the nose of detent 186, raising it and rocking the lever 166 momentarily to a slight extent against the action of the effectively weaker spring 172. Finally, as the door closes, the nose 192 of detent 186 drops below the pin 194 locking the door.

If the switch 146 is not used, as may be the case in certain arrangements of the machine, and its position is bridged by a permanent connection, the door will close when the switch 140 is momentarily open since at such time the relays 318 and 330 will be deenergized.

While the description of the operation by the motor is complex, the motor is desirably of a type which operates the shaft 10 through its single revolution in a very short interval, noting again that the motor is subjected to a braking action which brings it very quickly to rest when it is deenergized. Thus, all of the operations referred to take place, from the standpoint of the customer, practically instantaneously. It may be here noted that while relocking of the door was referred to, if a second token was located in position to move the switch 300 to its upper position, and the switch 146 had properly closed, the relay 318 would again be energized and through the same operations as described above the solenoid 184 would again be energized so that the door would be released and the customer could proceed with another operation just as already described. The possibility of repeated operation ceases, of course, when no token is at the lower end of the chute.

It will be noted that a subsequent operation depends upon the release of the slide 236, so that an attempt to produce a second operation by holding the slide downward would be defeated. For any token to become operative to provide a machine cycle the slide 236 must be fully depressed and released.

Whenever there is no token present to shift the switch 300 the operation ceases and the door is locked, solenoid 194 being deenergized.

While the operations have been described as controlled by tokens, it will be evident that other control, local or remote, may be effected by providing for operation, in some suitable fashion, of the switch 300 which in such case may be otherwise located. For example, a manually operated equivalent switch may be actuated from a remote position, and provision may be made for automatic repeated operations of this switch under a programmed control set to provide a desired number of operations. Such operations will generally be under the control of an attendant to insure that a customer may not obtain unwarranted contracts.

It will be evident that various other modifications may be provided without departing from the invention as defined in the following claims.

What is claimed is:

1. A machine for the production of transaction forms comprising means delimiting a write-in area, means providing a backing surface below said area, a member movable to close and open said area, means for guiding and feeding at least two superimposed paper strips across said area above said backing surface and below said movable member so that when matter is written on a portion of the uppermost of said sheets exposed in said write-in area it is reproduced on the lower of said sheets, means for latching the movable member in open position, control means effecting a cycle of operation involving release of said movable member from said latching means and closure thereof, and predetermined feed of said strips, and means driven by the lower of said strips during each feed thereof to an extent to measure its movement and effective to prevent operation by said control means whenever the lower strip is not fed to the predetermined extent in any cycle of operation.

2. A machine according to claim 1 in which the guiding and feeding means moves both of said strips in the same direction.

3. A machine according to claim 1 including means for severing a leading portion of the upper strip.

4. A machine according to claim 1 including severing means for the uppermost strip, said severing means including a movable knife, and a fixed knife between which said upper strip is fed when the movable knife is in an open position, and said machine comprising means for yieldably holding the movable knife in its open position against spring force and arranged to release it at the time of cutting for rapid movement by said spring force.

5. A machine for the production of transaction forms comprising means delimiting a write-in area, means providing a backing surface below said area, a member movable to close and open said area, means for guiding and feeding at least two superimposed paper strips across said area above said backing surface and below said movable member so that when matter is written on a portion of the uppermost of said sheets exposed in said write-in area it is reproduced on the lower of said sheets, means for locking said movable member in closed position, means for releasing said locking means so that the movable member may be manually moved to open position, means for latching the movable member in open position, and control means effecting a cycle of operation involving release of said movable member from said latching means and closure thereof, and predetermined feed of said strips, said control means including a token receptacle arranged to hold simultaneously a plurality of tokens and means responsive to tokens in said receptacle to energize the control means a plurality of times corresponding to the number of tokens initially located in the receptacle, thereby to effect successively a number of said predetermined feeds equal to said number of tokens.

References Cited by the Applicant
UNITED STATES PATENTS

| | | | |
|---|---|---|---|
| 1,141,170 | 6/1915 | Boerner | 282—16 |
| 2,612,976 | 10/1952 | Harper et al. | 282—16.5 X |
| 2,656,199 | 10/1953 | Winders | 282—5 |
| 2,854,116 | 9/1958 | Gray | 194—10 |
| 2,957,567 | 10/1960 | Doud | 282—16 X |
| 3,092,234 | 6/1963 | Edwards et al. | 282—16.3 X |
| 3,117,807 | 1/1964 | Weingart | 282—16 X |

LAWRENCE CHARLES, *Primary Examiner.*